United States Patent
Park et al.

(10) Patent No.: US 6,753,934 B2
(45) Date of Patent: Jun. 22, 2004

(54) ARRAY SUBSTRATE FOR A LIQUID CRYSTAL DISPLAY DEVICE AND A MANUFACTURING METHOD THEREOF

(75) Inventors: Jae-Deok Park, Gyeongsangbuk-do (KR); Yong Min Ha, Gumi-si (JP)

(73) Assignee: LG.Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/206,356

(22) Filed: Jul. 29, 2002

(65) Prior Publication Data

US 2003/0020853 A1 Jan. 30, 2003

(30) Foreign Application Priority Data

Jul. 30, 2001 (KR) .......................................... 2001-45799

(51) Int. Cl.[7] ............................................. G02F 1/1343
(52) U.S. Cl. .......................... 349/39; 349/113; 349/114; 349/140
(58) Field of Search ............................. 349/39, 113, 114, 349/140

(56) References Cited

U.S. PATENT DOCUMENTS 5,674,599 A * 10/1997 Yamada ...................... 428/212
6,195,140 B1 * 2/2001 Kubo et al. .................. 349/44
6,600,534 B1 * 7/2003 Tanaka et al. ............... 349/113

* cited by examiner

Primary Examiner—Tarifur R. Chowdhury
Assistant Examiner—Michael H. Caley
(74) Attorney, Agent, or Firm—McKenna Long & Aldridge LLP

(57) ABSTRACT

An array substrate for a transflective liquid crystal display device includes a substrate; a thin film transistor on the substrate, the thin film transistor including an active layer, a gate electrode, a source electrode and a drain electrode; a gate line connected to the gate electrode; a data line connected to the source electrode, the data line defining a pixel region with the gate line; an active extension portion extending from the active layer to the pixel region, a first insulating layer on the active extension portion; a storage electrode on the first insulating layer over the active extension portion; a second insulating layer on the storage electrode; a reflective plate on the second insulating layer over the storage electrode, the reflective plate extending over one end of the data line and connected to an adjacent reflective plate; a third insulating layer on the reflective plate; and a pixel electrode on the third insulating layer, the pixel electrode extending over one end of the data line and connected to the drain electrode.

18 Claims, 14 Drawing Sheets

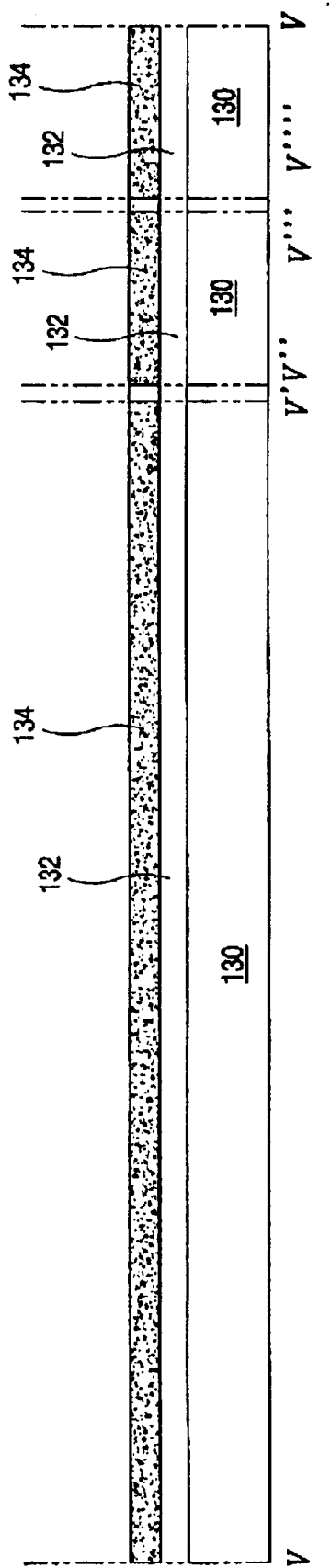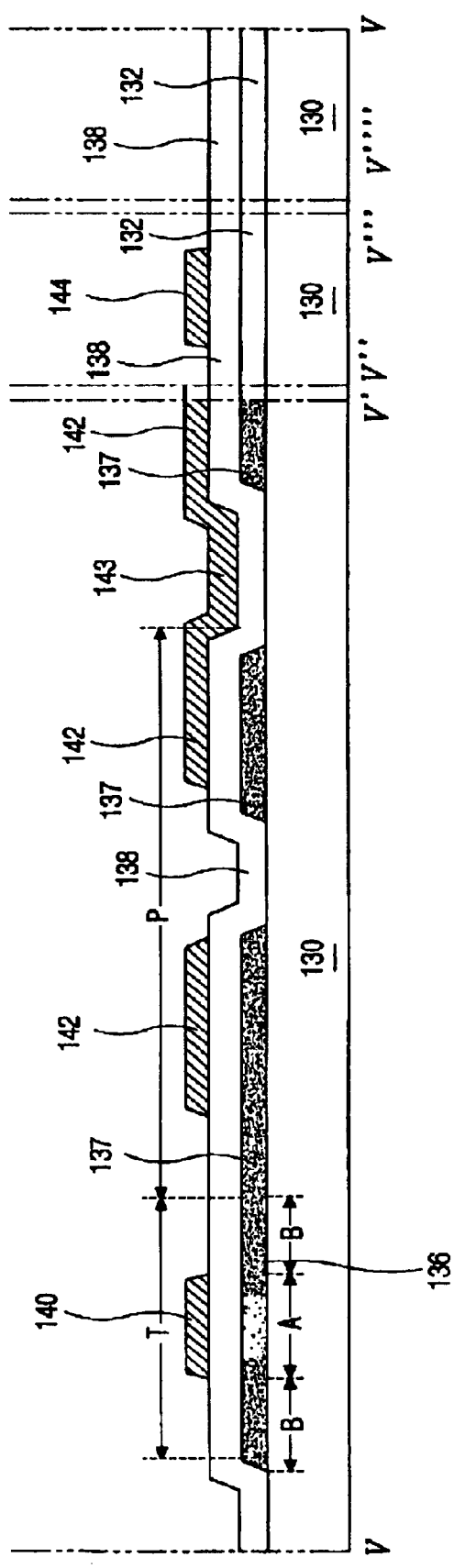
FIG. 5A
FIG. 5B

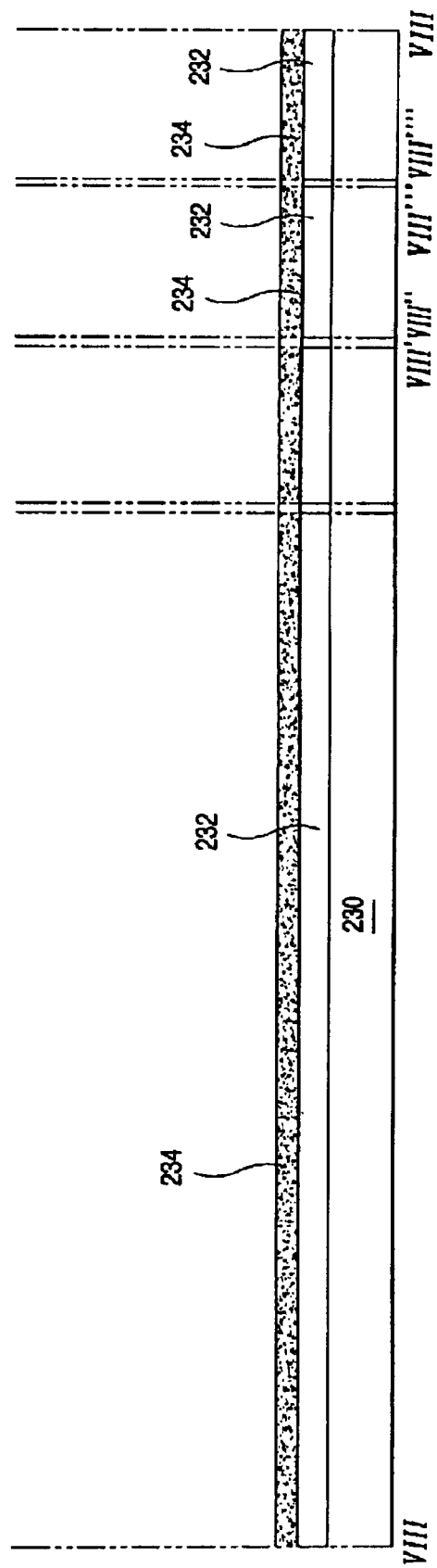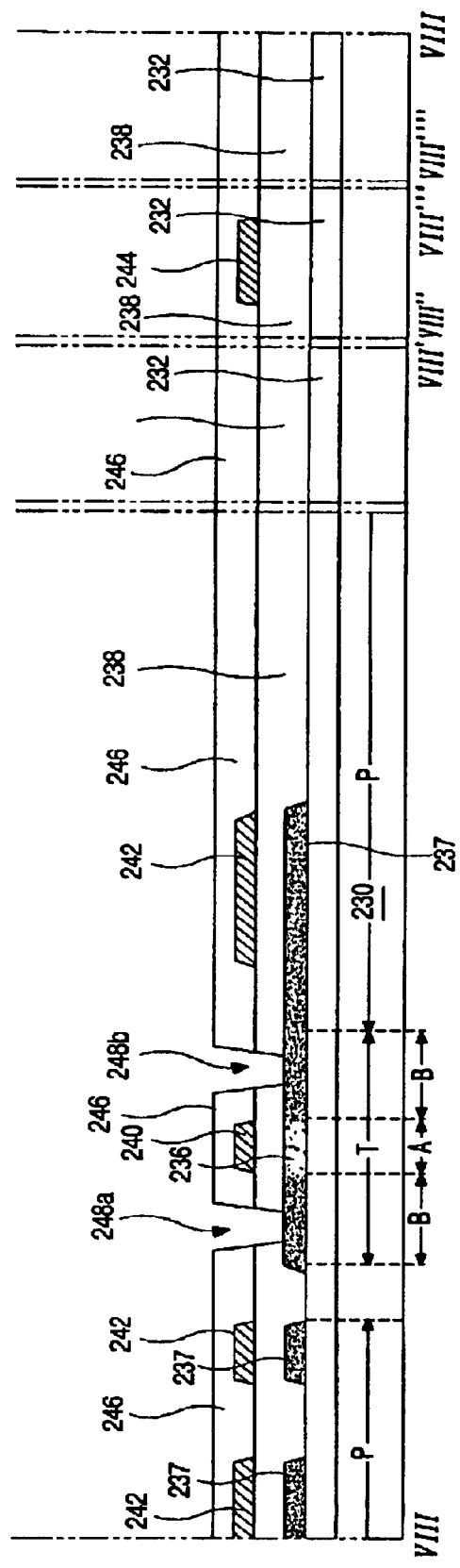
FIG. 8A
FIG. 8B

US 6,753,934 B2

ARRAY SUBSTRATE FOR A LIQUID CRYSTAL DISPLAY DEVICE AND A MANUFACTURING METHOD THEREOF

This application claims the benefit of Korean Patent Application No. 2001-45799, filed on Jul. 30, 2001, which is hereby incorporated by reference for all purposes as if fully set forth herein.

BACKGROUND OF THE INVENTION

1. Field of the Invention

The present invention relates to a liquid crystal display (LCD) device, and more particularly to a transflective LCD device including a poly crystalline silicon (p-Si) thin film transistor (TFT).

2. Discussion of the Related Art

In general, transflective LCD devices function as both transmissive and reflective LCD devices at the same time. The transflective LCD devices can use light of a backlight and ambient light of natural or artificial light source and thus do not depend on environmental conditions. Therefore, power consumption of the transflective LCD device is reduced. Accordingly, the transflective LCD devices are currently the subject of research and development.

FIG. 1 is a schematic plan view of an array substrate for a conventional transmissive LCD device.

In FIG. 1, a gate line 6, a storage line 7 and a data line 10 are formed on an array substrate 2. The gate line 6 includes a gate pad 4 at its one end. The storage line 7 is parallel to the gate line 6. The data line 10 including a data pad 8 at its one end crosses the gate line 6 and the storage line 7. The data line 10 defines a pixel region "P" with the gate line 6. A transparent pixel electrode 18 is formed at the pixel region "P". A signal is applied to a gate pad terminal 5 contacting the gate pad 4 through a gate pad contact hole 32 and a data pad terminal 9 contacting the data pad 8 through a data pad contact hole 34 from exterior. A thin film transistor (TFT) "T" having a gate electrode 12, an active layer 17, and source and drain electrodes 14 and 16 is formed near a crossing point of the gate and data lines 6 and 10. The TFT "T" has a coplanar structure in which source and drain regions are formed in the same plane as the active layer 17. The active layer 17 is made of poly crystalline silicon. The pixel electrode 18 is connected to the drain electrode 16 through a drain contact hole 28. The gate electrode 12 and the source electrode 14 are connected to the gate line 6 and the data line 10, respectively. A storage capacitor "C" including the storage line 7 is formed at a portion of the pixel region "P". The storage capacitor "C" also includes a metal layer 15 of island shape connected to the pixel electrode 18 through a storage contact hole 30. Charges are thereby stored in the storage line 7 and the metal layer 15.

FIG. 2 is a schematic cross-sectional view taken along a line II—II of FIG. 1.

In FIG. 2, a buffer layer 20, namely, a first insulating layer is formed on a substrate 2 and a semiconductor layer 17 of island shape is formed on the buffer layer 20. A center portion of the semiconductor layer 17 is a first active region 17a functioning as an active channel, and edge regions of the semiconductor layer 17 are second active regions 17b and 17c doped with impurities a subsequent process. Next, a gate insulating layer 22, namely, a second insulating layer is formed on the semiconductor layer 17. Next, a gate electrode 12, a gate line 6 and a gate pad 4 of conductive metallic material are formed on the gate insulating layer 22. The gate line 6 extends along a first direction and is connected to the gate electrode 12 formed over the semiconductor layer 17. The gate pad 4 is disposed at one end of the gate line 6. A storage line 7 extends along the first direction and is parallel to the gate line 6. The second active regions 17b and 17c are doped with impurities by using the gate electrode 12 as a doping mask. After forming an interlayer insulator 24, namely, a third insulating layer on an entire surface of the substrate 2, the second active regions 17b and 17c are exposed by patterning the interlayer insulating layer 24 and the gate insulating layer 22. Next, a source electrode 14, a drain electrode 16, a storage electrode 15, a data line 10 and a data pad 8 are formed through depositing and patterning conductive metallic material. The source and drain electrodes 14 and 16 are connected to the second active regions 17b and 17c. The data pad 8 is disposed at one end of the data line 10 extending along a second direction and connected to the source electrode 14. Next, a passivation layer 26, namely, a fourth insulating layer having a drain contact hole 28, a storage contact hole 30, a gate pad contact hole 28 and a data pad contact hole 34 is formed through depositing and patterning transparent organic material. The drain electrode 16, the storage electrode 15, the gate pad 4 and the data pad 8 are exposed through the drain contact hole 28, the storage contact hole 30, the gate pad contact hole 28 and the data pad contact hole 34, respectively. Next, a pixel electrode 18 contacting the drain electrode 16, a gate pad terminal 5 contacting the gate pad 4 and a data pad terminal 9 contacting the data pad 8 are formed on the passivation layer 26 through depositing and patterning transparent conductive material.

The conventional transmissive LCD devices, however, have high power consumption due to a limitation of the light source. To overcome this problem, transflective LCD devices have been developed.

FIG. 3 is a schematic cross-sectional view of an array substrate for a conventional transflective LCD device.

In FIG. 3, an array substrate 30 for a transflective LCD device has substantially same structure as that for a transmissive LCD device except a pixel electrode 63 and a reflective electrode 72 at a pixel region "P". That is, a gate line 41 and a data line 54 of matrix type are formed on the substrate 30, and a TFT "T" is formed near a crossing point of the gate and data lines 41 and 54. The TFT "T" of coplanar structure is a p-Si TFT having an active layer made of poly crystalline silicon. Gate and data pads 44 and 56 to which a signal is applied are formed at one end of the gate and data lines 41 and 54, respectively. Further, gate and data pad terminals 64 and 66 of transparent conductive material are connected to the gate and data pads 44 and 56, respectively. The TFT "T" includes an active layer 36, a gate electrode 40, source and drain electrodes 50 and 52. The active layer 36 includes an active extension portion 37 at the pixel region "P". A storage line 42 of the same material as the gate line 41 is formed along a first direction and crosses the pixel region "P". Further, the storage line 42 includes a storage electrode 43 at the pixel region "P". A transparent pixel electrode 63 is connected to the drain electrode 52 through a first drain contact hole 62. A reflective electrode 72 connected to the pixel electrode 63 through a second drain contact hole 70 is formed over the storage electrode 43.

Therefore, a storage capacitor portion "C" and a reflective portion "E" are formed at the same portion of the pixel region "P". Here, the storage capacitor portion "C" includes a first storage capacitor between the active extension portion 37 and the storage electrode 43, and a second storage capacitor between the storage electrode 43 and the pixel electrode 63. Since the reflective electrode 72 covers the storage electrode 43, the reflective portion "E" also covers the storage capacitor portion "C". The other portion of the pixel region "P" not including the reflective portion "E" is a transmissive portion "F".

In the array substrate for the conventional transflective LCD device, the reflective electrode is formed over the pixel electrode with an insulating layer interposed therebetween and connected to the pixel electrode through the second drain contact hole. As a result, the fabricating process has many steps and the production cost is high.

SUMMARY OF THE INVENTION

Accordingly, the present invention is directed to a liquid crystal display device that substantially obviates one or more of problems due to limitations and disadvantages of the related art.

An advantage of the present invention is to provide an array substrate including a reflective plate at a boundary of a pixel region under a transparent electrode, thereby simplifying fabrication steps, increasing production yield and display quality.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device includes a substrate; a thin film transistor on the substrate, the thin film transistor including an active layer, a gate electrode, a source electrode and a drain electrode; a gate line connected to the gate electrode; a data line connected to the source electrode, the data line defining a pixel region with the gate line; an active extension portion extending from the active layer to the pixel region; a first insulating layer on the active extension portion; a storage electrode on the first insulating layer over the active extension portion; a second insulating layer on the storage electrode; a reflective plate on the second insulating layer over the storage electrode, the reflective plate extending over one end of the data line and connected to an adjacent reflective plate; a third insulating layer on the reflective plate; and a pixel electrode on the third insulating layer, the pixel electrode extending over one end of the data line and connected to the drain electrode.

In another aspect, a fabricating method of an array substrate for a transflective liquid crystal display device includes forming a thin film transistor on a substrate, the thin film transistor including an active layer, a gate electrode, a source electrode and a drain electrode; forming a gate line connected to the gate electrode; forming a data line connected to the source electrode, the data line defining a pixel region with the gate line; forming an active extension portion extending from the active layer to the pixel region; forming a first insulating layer on the active extension portion; forming a storage electrode on the first insulating layer over the active extension portion; forming a second insulating layer on the storage electrode; forming a reflective plate on the second insulating layer over the storage electrode, the reflective plate extending over one end of the data line and connected to an adjacent reflective plate; forming a third insulating layer on the reflective plate; and forming a pixel electrode on the third insulating layer, the pixel electrode being extending over one end of the data line and connected to the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings:

FIGS. 5A to 5E are cross-sectional views illustrating fabricating processes of an array substrate for a transflective LCD device according to an exemplary embodiment of the present invention;

FIGS. 8A to 8E are cross-sectional views illustrating fabricating processes of an array substrate for a transflective LCD device according to another exemplary embodiment of the present invention.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
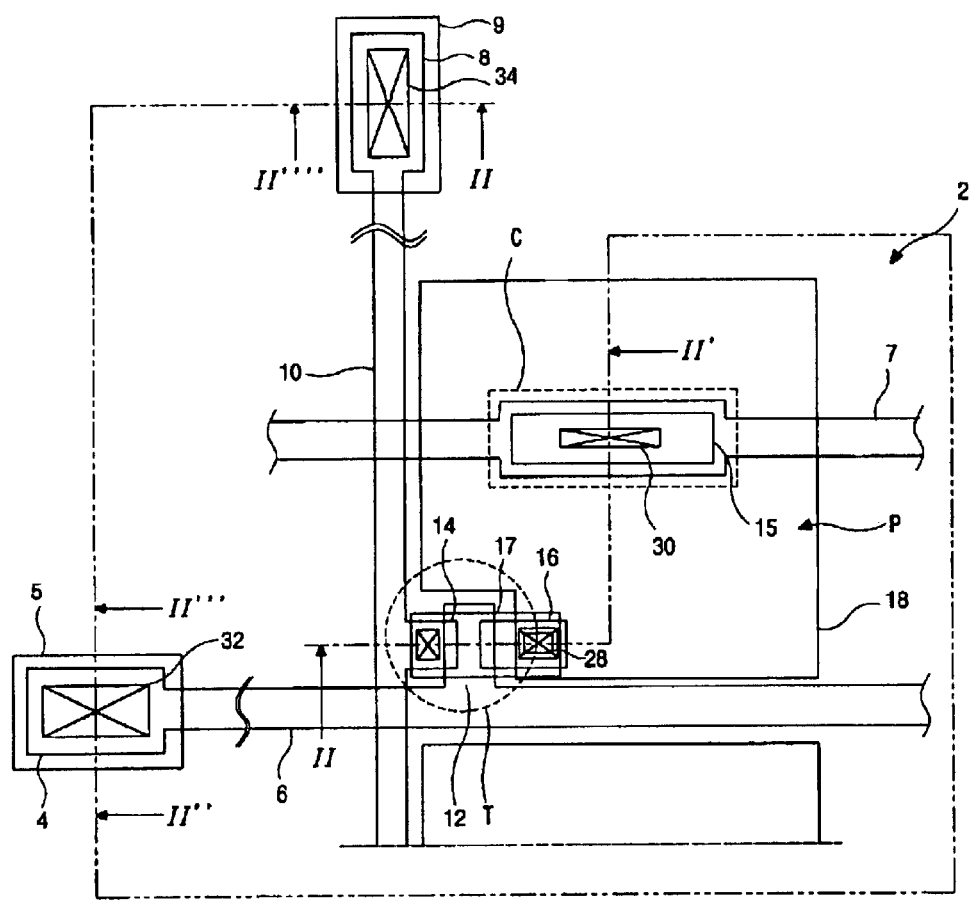
FIG. 1 is a schematic plan view of an array substrate for a conventional transmissive LCD device.
Figure 2:
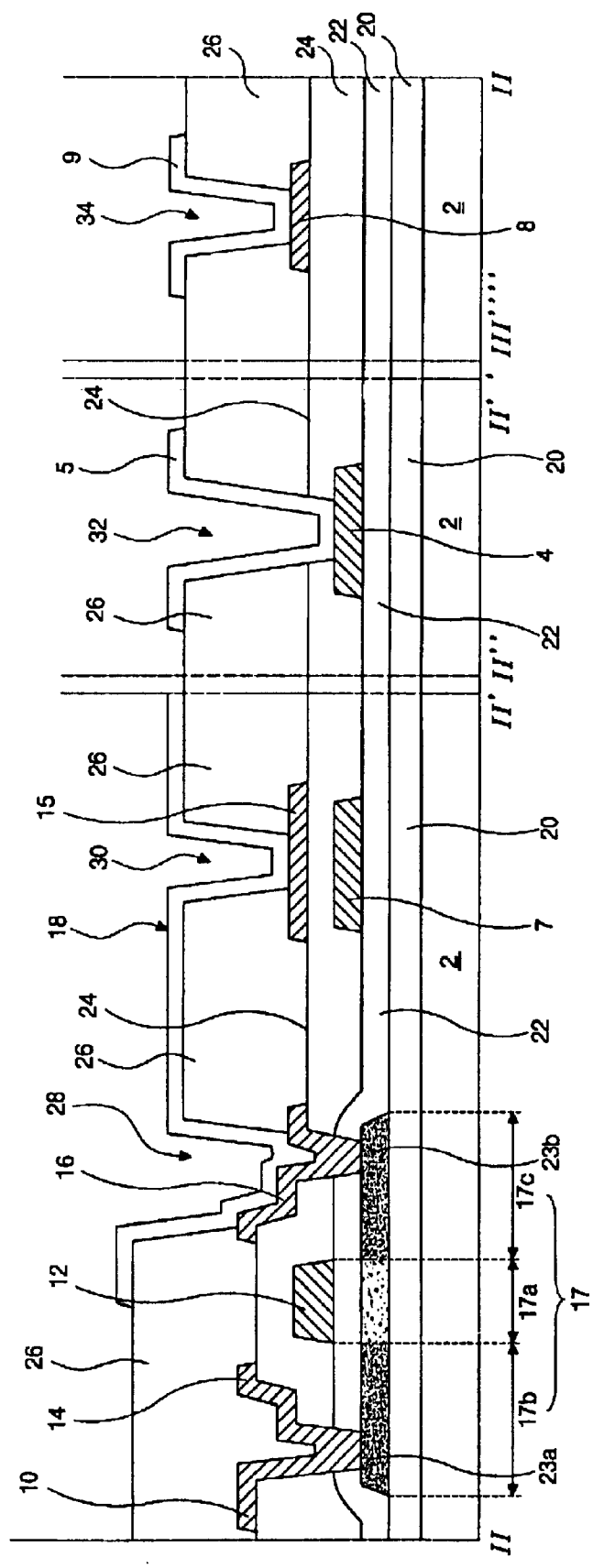
FIG. 2 is a schematic cross-sectional view taken along a line II—II of FIG. 1.
Figure 3:
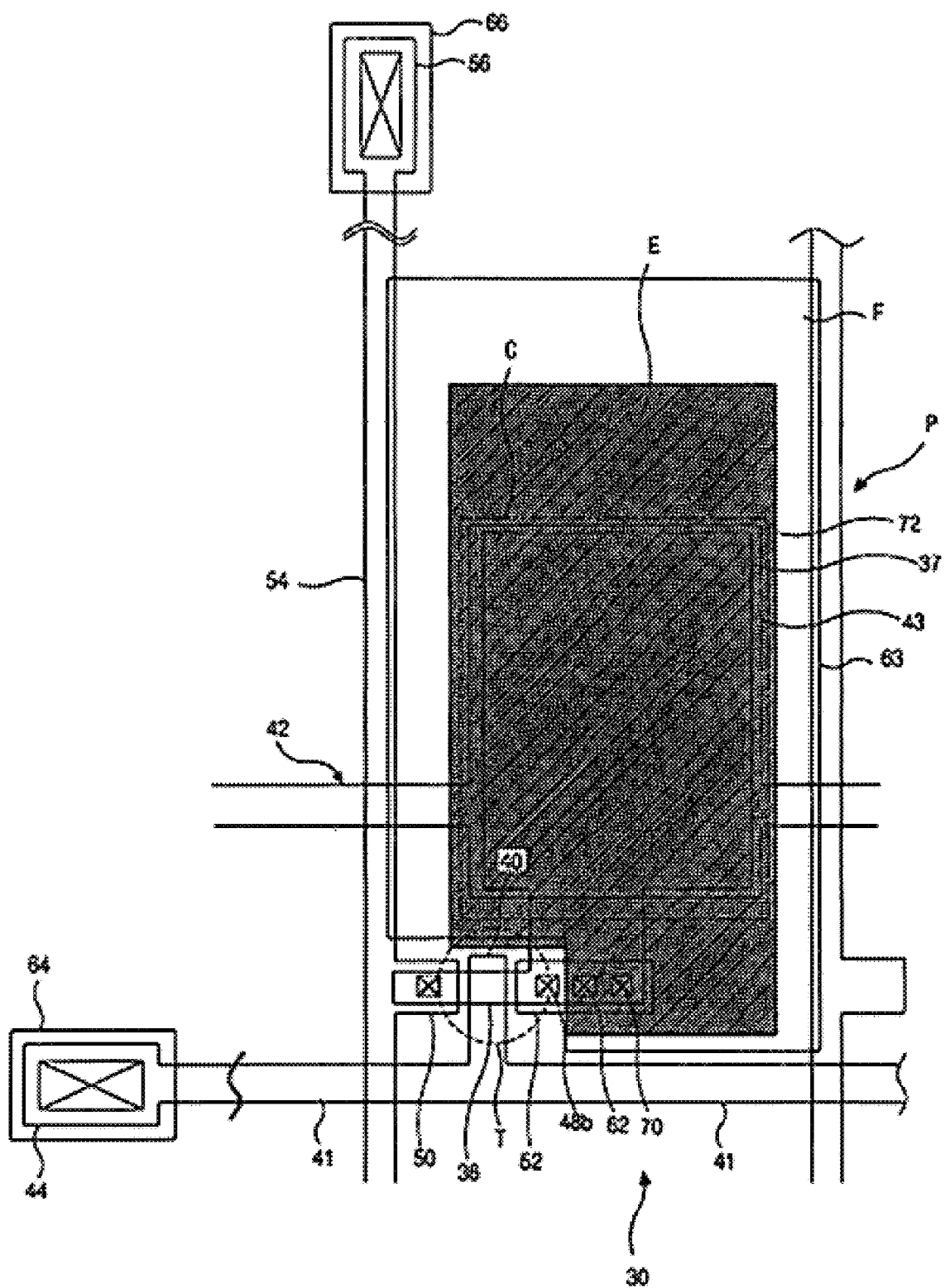
FIG. 3 is a schematic cross-sectional view of an array substrate for a conventional transflective LCD device.
Figure 4:
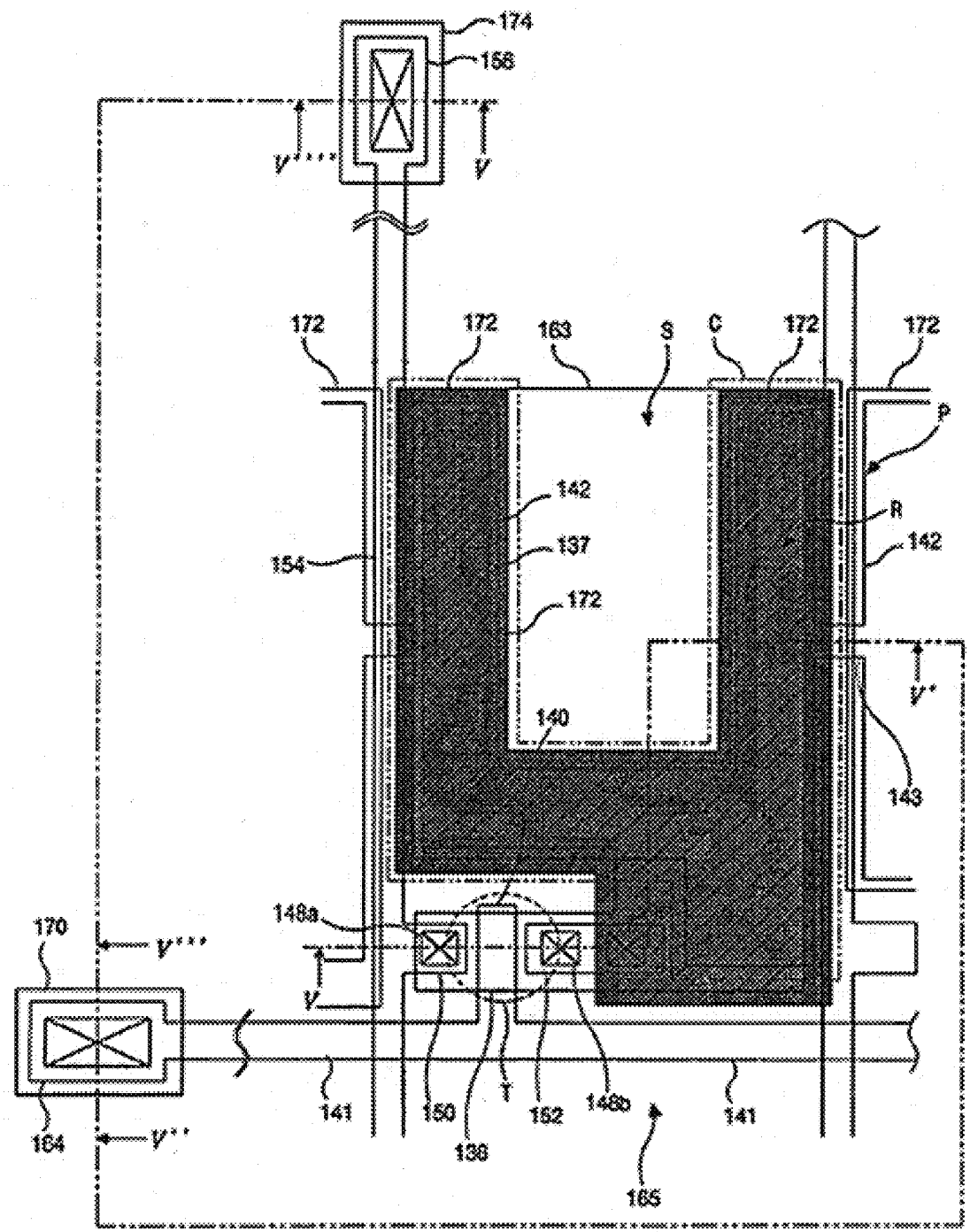
FIG. 4 is a schematic plan view of an array substrate for a transflective LCD device according to an exemplary embodiment of the present invention.

FIG. 4 is a schematic plan view of an array substrate for a transflective LCD device according to an exemplary embodiment of the present invention.

In FIG. 4, a gate line and a data line 154 crossing each other and defining a pixel region "P" are formed on a substrate 165. An insulating layer (not shown) is interposed between the gate line and the data line 154. The gate line and the data line 154 include a gate pad 164 and a data pad 156 at their one end, respectively. In operation, a scan signal is applied to the gate pad 164 and an image signal is applied to the data pad 156. A thin film transistor "T" of coplanar structure is disposed near a crossing portion of the gate and data lines and 154. The thin film transistor "T" includes an active layer 136, a gate electrode 140, and source and drain electrodes 150 and 152. The source and drain electrodes 150 and 152 are disposed at both sides of the gate electrode 140 and connected to the active layer 136 through contact holes 148a and 148b. The source electrode 150 is electrically connected to the data line 154. A transparent pixel electrode 163 connected to the drain electrode 152 is formed at the entire pixel region "P" and an active extension portion 137 extending from the active layer 136 is formed at a boundary of the pixel region "P". A storage electrode 142 of the same shape as the active extension portion 137 is formed on the active extension portion 137. A reflective plate 172 covering the storage electrode 142 extends over the data line 154. The transparent pixel electrode 163 overlaps the reflective plate 172. The storage electrode 142 is connected to an adjacent storage electrode through a storage line 143 crossing the data line 154 so that the same signal can be applied.

The pixel region "P" includes a reflective portion "R" at a boundary thereof and a transmissive portion "S" at a center thereof. The reflective plate 172 is formed only at the reflective portion "R" and a storage capacitor "C" is also formed at the reflective portion "R". Since the reflective portion "R" is extended over the data line 154, reflectivity and display quality are improved. Moreover, since the reflective plate 172 under the transparent pixel electrode 163 is electrically floated, an additional process and material for connecting the reflective plate 172 and the transparent pixel electrode 163 are not necessary.

FIGS. 5A to 5E are cross-sectional views illustrating fabricating processes of an array substrate for a transflective LCD device according to an exemplary embodiment of the present invention. FIGS. 5A to 5E are taken along a line V—V of FIG. 4.

In FIG. 5A, a buffer layer 132, i.e., a first insulating layer, is formed on a substrate 130 by depositing one of inorganic insulating material group including silicon oxide ($SiO_2$) and silicon nitride (SiNx). The buffer layer 132 may be omitted. Next, after depositing amorphous silicon (a-Si:H) on the buffer layer 132, a poly crystalline silicon layer 134 is formed through crystallizing the amorphous silicon.

In FIG. 5B, an active layer 136 of island shape is formed at a thin film transistor region "T" and a pixel region "P" through patterning the poly crystalline silicon layer 134. Simultaneously, an active extension portion 137 extending from the active layer 136 to the pixel region "P" is formed at a boundary of the pixel region "P" roughly in a shape of the letter "U" as can be seen in FIG. 4. The active layer 136 includes a first active region "A" functioning as an active channel and a second active region "B" doped with impurities. Next, a gate insulating layer 138, i.e., a second insulating layer is formed on an entire surface of the substrate 130 by depositing one of inorganic insulating material group including silicon oxide ($SiO_2$) and silicon nitride (SiNx). Next, a gate electrode (of FIG. 4) and a gate pad 144 are formed on the gate insulating layer 138 by depositing and patterning conductive metal. The gate electrode 140, is formed at the first active region "A". The gate line 141 (of FIG. 4) is connected to the gate electrode 140 and the gate pad 144 is formed at one end of the gate line 141 (of FIG. 4).

Simultaneously, a storage electrode 142 parallel to and spaced apart from the gate line (of FIG. 4) is electrically connected to a storage line 143, which is connected to an adjacent storage electrode of an adjacent pixel region. The storage electrode 142 over the active extension portion 137 has roughly a shape of the letter "U". After forming the gate electrode 140, the second active region "B" is doped with impurities. The gate electrode 140 functions as a ion stopper or mask that prevents dopants from penetrating into the first active region "A". The electrical property of the active layer 136 depends on a kind of the dopants. If the dopants belong to Group III such as $B_2H_6$, the TFT becomes p-type. If the dopants belong to Group V such as $PH_3$, the TFT becomes n-type. The dopants may be relevantly selected according to use of the TFT. After doping the active layer 136, an activation process for the dopants is performed.

Figure 5C:
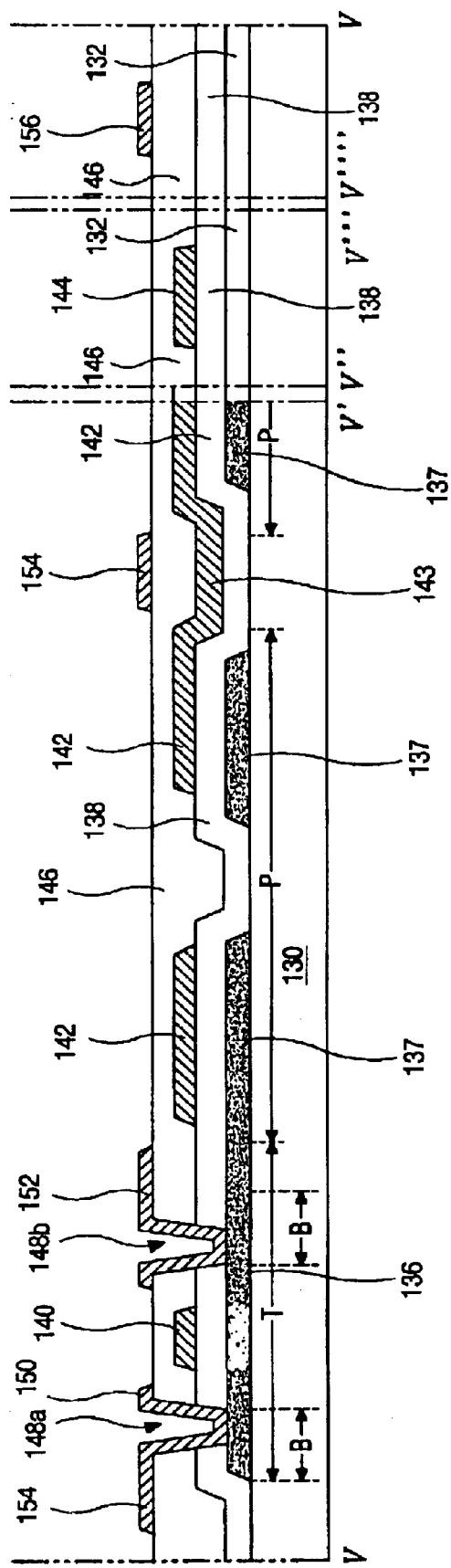

In FIG. 5C, after depositing insulating material on an entire surface of the substrate 130, an interlayer insulating layer 146, i.e., a third insulating layer, having first and second contact holes 148a and 148b is formed by patterning. The first and second contact holes 148a and 148b expose the active layer 136. Next, after depositing one of conductive metal group including aluminum (Al), aluminum alloy, chromium (Cr), tungsten (W), molybdenum (Mo) and neodymium (Nd) on the interlayer insulating layer 146, source and drain electrodes 150 and 152 are formed by patterning. The source and drain electrodes 150 and 152 are connected to the second active region "B" and spaced apart from each other.

A data line 154 and a data pad 156 are formed simultaneously. The data line 154 is connected to the source electrode 150, and the data pad 156 is disposed at one end of the data line 154. The data line 154 crosses the gate line 141 (of FIG. 4) and defines the pixel region "P" with the gate line (of FIG. 4).

Figure 5D:
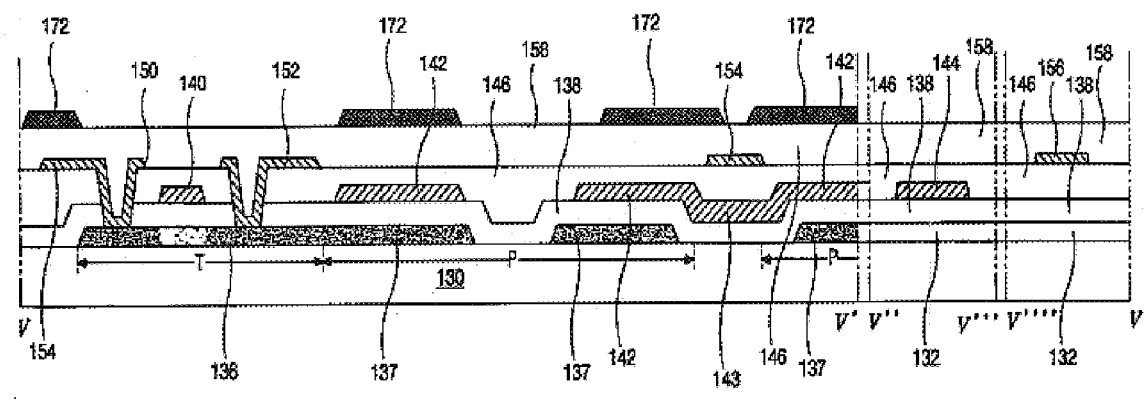

In FIG. 5D, after forming a fourth insulating layer 158 through depositing insulating material on the source and drain electrodes 150 and 152, a hydrogenation process for a TFT is performed. Next, a reflective plate 172 is formed at the pixel region "P" by depositing and patterning one of conductive metal group including aluminum (Al) and aluminum alloy on the fourth insulating layer 158. The reflective plate 172 overlaps the storage electrode 142, which is roughly in a shape of the letter "U", and a portion of the data line 154.

Figure 5E:
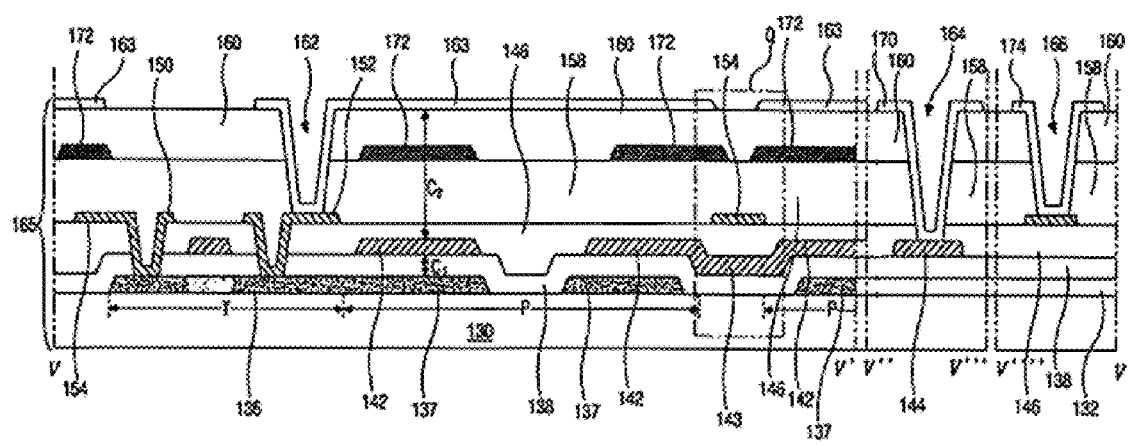

In FIG. 5E, a fifth insulating layer 160 having a drain contact hole 162, a gate pad contact hole 164 and a data pad contact hole 166 is formed by depositing and patterning one of organic insulating material group including benzocyclobutene (BCB) and acrylic resin. The drain contact hole 162, the gate pad contact hole 164 and the data pad contact hole 166 expose the drain electrode 152, the gate pad 144 and the data pad 156, respectively. Next, a pixel electrode 163, a gate pad terminal 170 and a data pad terminal 174 are formed on the fifth insulating layer 160 by depositing and patterning one of transparent conductive metal group including indium-tin-oxide (ITO) and indium-zinc-oxide (IZO). The pixel electrode 163 is connected to the drain electrode 152 and disposed at the pixel region "P". The gate pad terminal 170 and the data pad terminal 174 are connected to the gate pad 164 and the data pad 166, respectively.

The active extension portion 137 and the storage electrode 142 compose a first storage capacitor "$C_1$". Further, the storage electrode 142 and the pixel electrode 163 compose a second storage capacitor "$C_2$".

Since the array substrate according to the present invention has the reflective plate under the pixel electrode, an additional sixth insulating layer is not necessary, in contrast with the conventional array substrate. Accordingly, a process for an additional contact hole to contact the pixel electrode and a process for exposing the gate pad terminal and the data pad terminal are not necessary. Moreover, since the reflective plate extends over the data line, reflectivity and display quality of the transflective LCD device are improved. However, since the reflective plate and the pixel electrode extends over the data line, parasitic capacitors between the reflective plate and the data line, and between the data line and the pixel electrode may occur. These parasitic capacitors may distort a signal of the pixel electrode.

Figure 6:
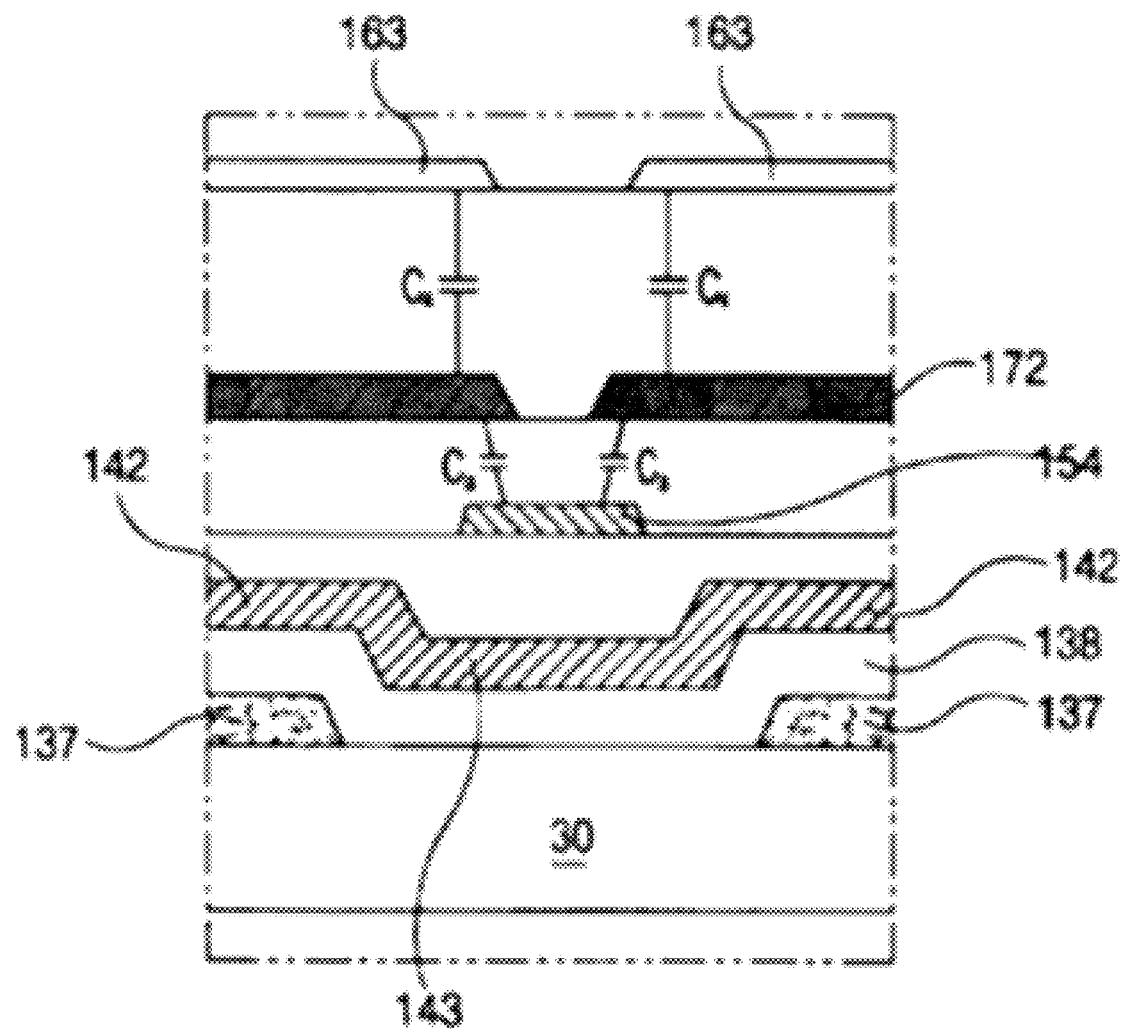
FIG. 6 is a schematic cross-sectional view magnifying a portion "Q" of FIG. 5E.

FIG. 6 is a schematic cross-sectional view magnifying a portion "Q" of FIG. 5E.

In FIG. 6, a reflective plate 172 extends over a side of a data line 154 and a pixel electrode 163 is formed over the reflective plate 172. Accordingly, a first parasitic capacitor $C_3$ between the data line 154 and the reflective plate 172, and a second parasitic capacitor $C_4$ between the reflective plate 172 and the pixel electrode 163 are formed. A vertical cross talk, phenomenon in which a pixel voltage applied to the pixel electrode is distorted due to these parasitic capacitors, which is a reason of display quality degradation.

To solve these problems, an array substrate in which a reflective electrode under a pixel electrode is connected to an adjacent reflective electrode and an external direct current (DC) voltage is applied to the reflective electrode is suggested in another exemplary embodiment of the present invention.

Figure 7:
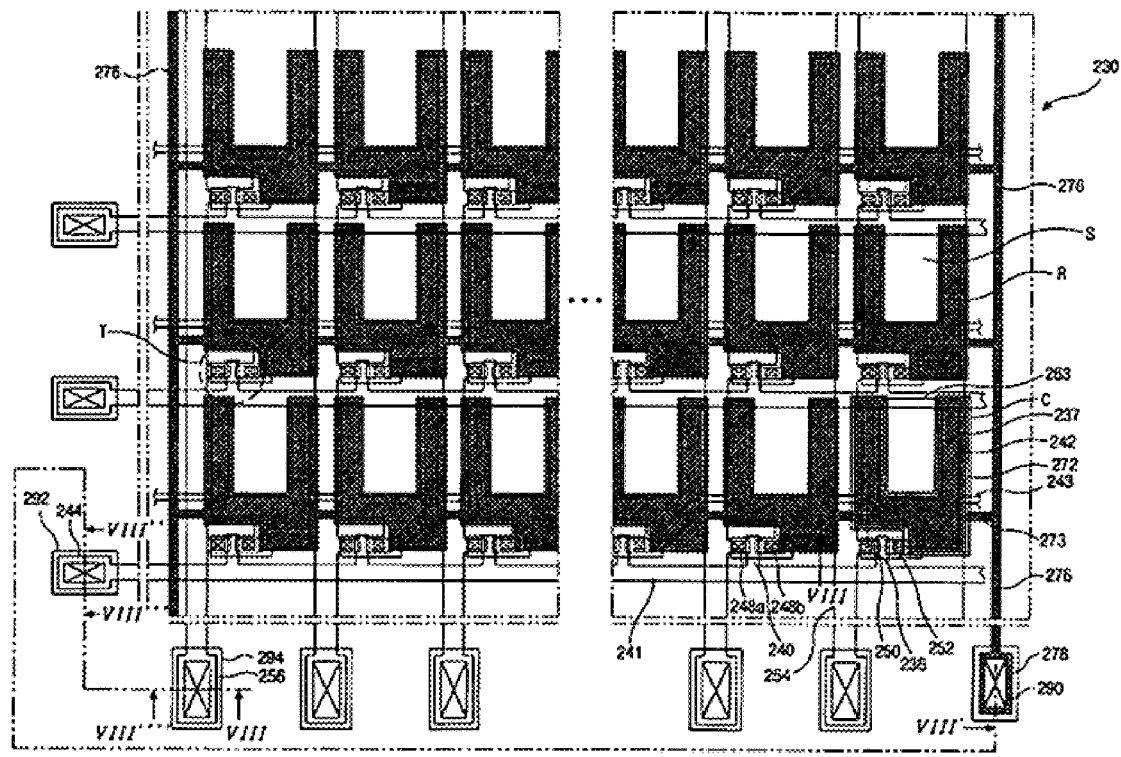
FIG. 7 is a schematic plan view of an array substrate according to another exemplary embodiment of the present invention.

FIG. 7 is a schematic plan view of an array substrate according to another exemplary embodiment of the present invention.

In FIG. 7, a gate line 241 and a data line 254 are formed over a substrate 230. The gate line 241 and the data line 254 cross each other and define a pixel region "T". An insulating layer (not shown) is interposed between the gate line 241 and the data line 254. A gate pad 244, to which a scan signal is applied is formed at one end of the gate line 241, and a data pad 256 to which a display signal is applied is formed at one end of the data line 254. A TFT "T" of coplanar structure is formed near crossing of the gate line 241 and the data line 254. The TFT "T" includes an active layer 236, a gate electrode 240, and source and drain electrodes 250 and 252. The gate electrode 240 is formed over the active layer 236. The source and drain electrodes 250 and 252 are disposed at both sides of the gate electrode 240 and connected to the active layer 236 through contact holes 248a and 248b. The source electrode 250 is electrically connected to the data line 254. A transparent pixel electrode 263 contacting the drain electrode 252 is formed at a pixel region "P". Further, an active extension portion 237 extending from the active layer 236 is disposed at a boundary of the pixel region "P". A storage electrode 242 having the same shape as the active extension portion 237 is formed over the active extension portion 237. A reflective plate 272 covering the storage electrode 242 and extended over the data line 254 is formed over the storage electrode 242. Since the storage electrode 242 is connected to an adjacent storage electrode through a storage line 243, which crosses the data line 254, the same signal is applied to all the storage electrodes.

Although only "U" shaped active extension portions 237, storage electrodes 242, and reflective plates 272 are illustrated in FIG. 7, other shapes are appropriate for use according to the principles set forth herein.

Since the reflective plate 272 and the pixel electrode 263 is extended over the data line 254, parasitic capacitors between the data line 254 and the reflective plate 272 and between the reflective plate 272 and the pixel electrode 263 may distort pixel voltage. To solve these problems, the reflective plates 272 are connected to each other and a terminal line 276 to apply an additional signal to all the reflective plates 272 is formed on the array substrate for a transflective LCD device according to the present invention. The terminal line 276 may be disposed at both sides of the substrate 230, and all the reflective plates 272 may be divided into odd and even groups. In this case, two signal input terminals 278 may be formed at both sides of the substrate 230. The terminal line 276 may be formed along a boundary of the substrate 230 and connected to all the reflective plates 272. In this case, only one signal input terminal 278 may be formed. Accordingly, a pixel voltage distortion due to overlapping of the pixel electrode 263 and the data line 254 is prevented, and liquid crystal molecules over the overlapping portion operate normally.

The pixel region "P" has a reflective portion "R" and a transmissive portion "S". The reflective portion "R" with the reflective plate 272 is disposed at a boundary of the pixel region "P" and the transmissive portion "S" without the reflective plate 272 is disposed at a center of the pixel region "P". Moreover, a storage capacitor "C" is formed at the reflective portion "R".

FIGS. 8A to 8E are cross-sectional views illustrating fabricating processes of an array substrate for a transflective LCD device according to another exemplary embodiment of the present invention. FIGS. 8A to 8E are taken along a line VIII—VIII of FIG. 7.

In FIG. 8A, a buffer layer 232, i.e., a first insulating layer, is formed on a substrate 230 by depositing one of inorganic insulating material group including silicon oxide ($SiO_2$) and silicon nitride (SiNx). The buffer layer 232 may be omitted. Next, after depositing amorphous silicon (a-Si:H) on the buffer layer 232, a poly crystalline silicon layer 234 is formed through crystallizing the amorphous silicon.

In FIG. 8B, an active layer 236 of island shape is formed at a thin film transistor region "T" and a pixel region "P" by patterning the poly crystalline silicon layer 234. Simultaneously, an active extension portion 237 extending from the active layer 236 to the pixel region "P" is formed at a boundary of the pixel region "P" roughly in a shape of the letter "U". The active layer 236 includes a first active region "A" functioning as an active channel and a second active region "B" doped with impurities. Next, a gate insulating layer 238, i.e., a second insulating layer is formed on an entire surface of the substrate 230 by depositing one of inorganic insulating material group including silicon oxide ($SiO_2$) and silicon nitride (SiNx). Next, a gate electrode 240, a gate line 241 (of FIG. 7) and a gate pad 244 are formed on the gate insulating layer 238 by depositing and patterning conductive metal. The gate electrode 240 is formed at the first active region "A". The gate line 241 (of FIG. 7) is connected to the gate electrode 240 and the gate pad 244 is formed at one end of the gate line 241 (of FIG. 7).

Simultaneously, a storage electrode 242 parallel to and spaced apart from the gate line 241 (of FIG. 7) is electrically connected to a storage line 243 that is connected to an adjacent storage electrode of an adjacent pixel region. The storage electrode 242 over the active extension portion 237 has roughly a shape of the letter "U". After forming the gate electrode 240, the second active region "B" is doped with impurities. The gate electrode 240 functions as a ion stopper or mask that prevents dopants from penetrating into the first active region "A". An electrical property of the active layer 236 depends on a kind of the dopants. If the dopants belong to Group III such as $B_2H_6$, the TFT becomes p-type. If the dopants belong to Group V, such as $PH_3$, the TFT becomes n-type. The dopants may be relevantly selected according to use of the TFT. After doping the active layer 236, an activation process for the dopants is performed.

Figure 8C:
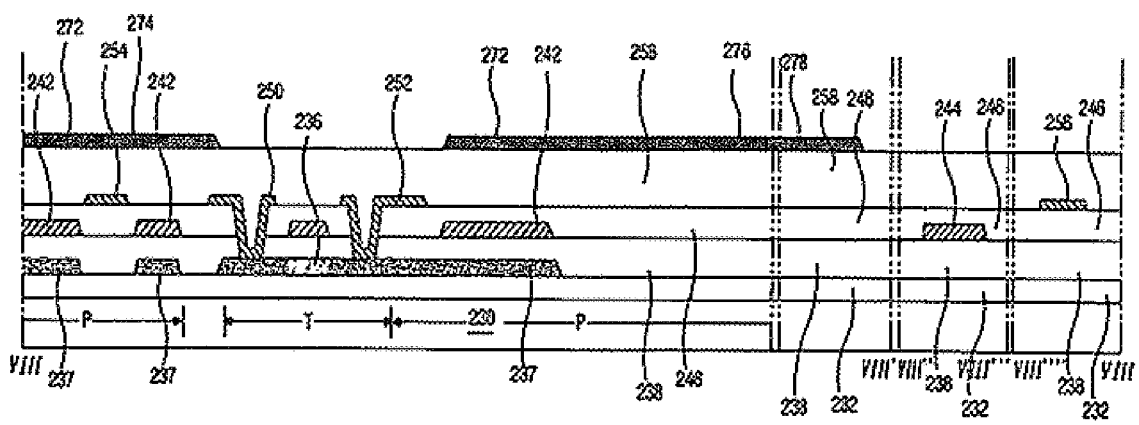

In FIG. 8C, after depositing insulating material on an entire surface of the substrate 230, an interlayer insulating layer 246, i.e., a third insulating layer, having first and second contact holes 248a and 248b is formed by patterning. The first and second contact holes 248a and 248b expose the active layer 236. Next, after depositing one of a conductive metal group, including aluminum (Al), aluminum alloy, chromium (Cr), tungsten (W), molybdenum (Mo) and neodymium (Nd) on the interlayer insulating layer 246, source and drain electrodes 250 and 252 are formed by patterning. The source and drain electrodes 250 and 252 are connected to the second active region "B" and spaced apart from each other.

Simultaneously, a data line 254 and a data pad 256 are formed. The data line 254 is connected to the source electrode 250 and the data pad 256 is disposed at one end of the data line 254. The data line 254 crosses the gate line 241 (of FIG. 7) and defines the pixel region "P" with the gate line 241 (of FIG. 7).

After forming a fourth insulating layer 258 through depositing insulating material on the source and drain electrodes 250 and 252, a hydrogenation process for a TFT is performed. Next, a reflective plate 272 is formed at the pixel region "P" by depositing and patterning one of conductive metal group, including aluminum (Al) and aluminum alloy on the fourth insulating layer 258. The reflective plate 272 is roughly in a shape of the letter "V" covers the storage electrode 242. Further, since the reflective plate 272 is connected to an adjacent reflective plate 272 through a reflective line 274, all the reflective plates 272 are connected to each other. Moreover, a terminal line 276 is formed at a boundary of the substrate 230 to apply an additional direct current (DC) voltage to all the reflective plates 272. The terminal line 276 may be disposed at both sides of the substrate 230 and all the reflective plates 272 may be divided into odd and even groups. In this case, two signal input terminals 278 may be formed at both sides of the substrate 230 contacting odd and even groups respectively. The terminal line 276 may be formed along a boundary of the substrate 230 and connected to all the reflective plates 272. In this case, only one signal input terminal 278 may be formed.

Figure 8D:
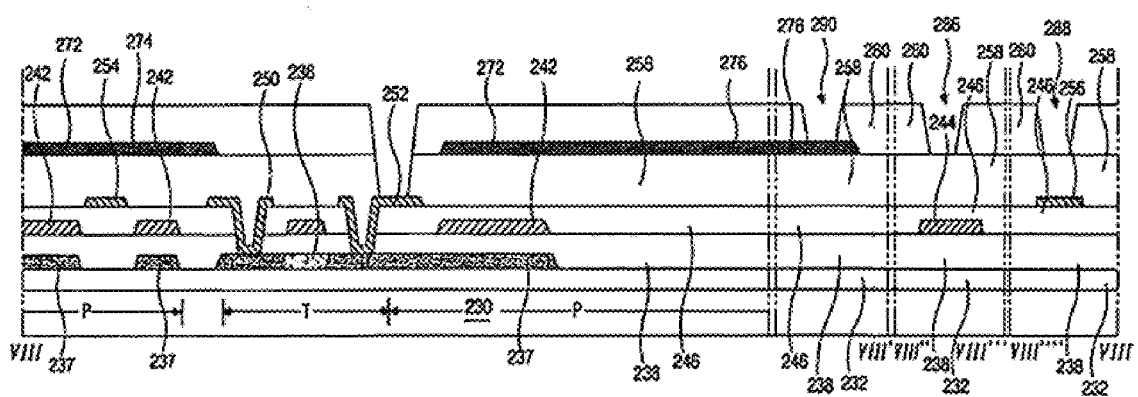

In FIG. 8D, a fifth insulating layer 280 having a drain contact hole 282, a gate pad contact hole 286, and a data pad contact hole 288 is formed by depositing and patterning one of organic insulating material group, including benzocyclobutene (BCB) and acrylic resin. The drain contact hole 282, the gate pad contact hole 286, and the data pad contact hole 288 expose the drain electrode 252, the gate pad 244, and the data pad 256, respectively. The fifth insulating layer 280 also has an input terminal contact hole 290 exposing the signal input terminal 278. The signal input terminal 278 is formed at one end of the terminal line 276.

Figure 8E:
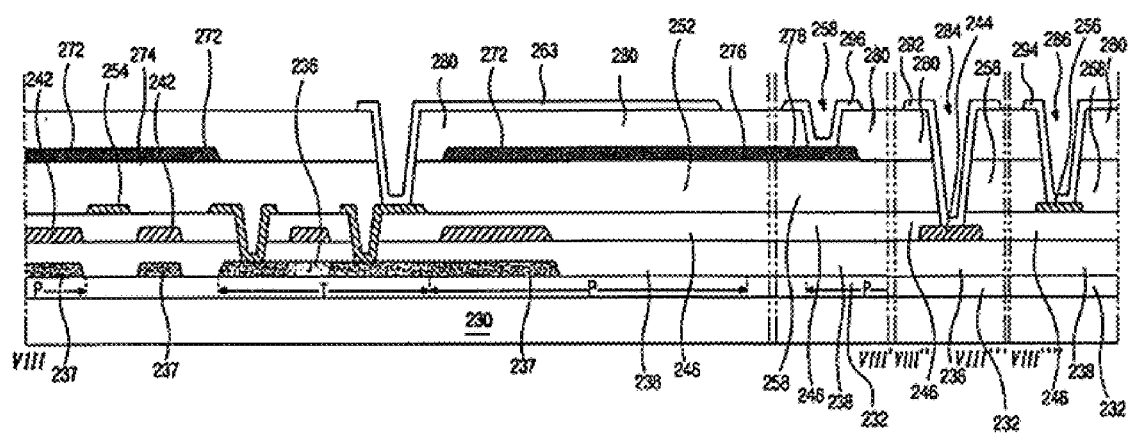

In FIG. 8E, a pixel electrode 263, a gate pad terminal 292, and a data pad terminal 294 are formed on the fifth insulating layer 280 by depositing and patterning one of transparent conductive metal group, including indium-tin-oxide (ITO) and indium-zinc-oxide (IZO). The pixel electrode 263 is connected to the drain electrode 252 and disposed at the pixel region "P". The gate pad terminal 292 and the data pad terminal 294 are connected to the gate pad 244 and the data pad 256, respectively. Simultaneously, an input terminal electrode 296 contacting the signal input terminal 278 is formed.

The active extension portion 237 and the storage electrode 242 comprise a first storage capacitor "$C_1$". Further, the storage electrode 242 and the pixel electrode 263 comprise a second storage capacitor "$C_2$".

In the array substrate according to the present invention, the reflective plate and the pixel electrode overlap the data line. However, since all the reflective plates are connected to each other and a DC voltage is applied to all the reflective plates, distortion of the pixel voltage due to parasitic capacitors between the reflective plate and the data line and between the data line and the pixel electrode is reduced. Accordingly, liquid crystal molecules at the overlapping portion operate normally and the display quality is improved. Moreover, since the process is simplified, throughput is improved.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display device, comprising:

a substrate;

a thin film transistor on the substrate, the thin film transistor including an active layer, a gate electrode, a source electrode and a drain electrode;

a gate line connected to the gate electrode;

a data line connected to the source electrode, the data line defining a pixel region with the gate line;

an active extension portion extending from the active layer to the pixel region;

a first insulating layer on the active extension portion;

a storage electrode on the first insulating layer over the active extension portion;

a second insulating layer on the storage electrode;

a reflective plate on the second insulating layer over the storage electrode, the reflective plate being extending over one end of the data line and connected to an adjacent reflective plate;

a third insulating layer on the reflective plate; and a pixel electrode on the third insulating layer, the pixel electrode being extending over one end of the data line and connected to the drain electrode.

2. The array substrate according to claim 1, wherein the active extension portion roughly has a shape of the letter "U".

3. The array substrate according to claim 1, wherein the storage electrode roughly has a shape of the letter "U".

4. The array substrate according to claim 1, wherein the reflective plate has a shape of character "U".

5. The array substrate according to claim 1, further comprising a buffer layer under the active layer.

6. The array substrate according to claim 5, wherein the buffer layer includes an inorganic insulating material.

7. The array substrate according to claim 6, wherein the inorganic insulating material is one of silicon nitride (SiNx) and silicon oxide ($SiO_2$).

8. The array substrate according to claim 1, wherein the storage electrode is in the same layer and of the same material as the gate line.

9. The array substrate according to claim 1, further comprising a terminal line formed at a boundary of the substrate and connected to the reflective plate.

10. A method of fabricating an array substrate for a transflective liquid crystal display device, the method comprising:

forming a thin film transistor on a substrate, the thin film transistor including an active layer, a gate electrode, a source electrode and a drain electrode;

forming a gate line connected to the gate electrode;

forming a data line connected to the source electrode, the data line defining a pixel region with the gate line;

forming an active extension portion extending from the active layer to the pixel region;

forming a first insulating layer on the active extension portion;

forming a storage electrode on the first insulating layer over the active extension portion;

forming a second insulating layer on the storage electrode;

forming a reflective plate on the second insulating layer over the storage electrode, the reflective plate extending over one end of the data line and connected to an adjacent reflective plate;

forming a third insulating layer on the reflective plate; and forming a pixel electrode on the third insulating layer, the pixel electrode extending over one end of the data line and connected to the drain electrode.

11. The method according to claim 10, wherein the active extension portion roughly has a shape of letter "U".

12. The method according to claim 10, wherein the storage electrode roughly has a shape of letter "U".

13. The method according to claim 10, wherein the reflective plate roughly has a shape of letter "U".

14. The method according to claim 10, further comprising forming a buffer layer under the active layer.

15. The method according to claim 14, wherein the buffer layer includes an inorganic insulating material.

16. The method according to claim 15, wherein the inorganic insulating material is one of silicon nitride (SiNx) and silicon oxide ($SiO_2$).

17. The method according to claim 10, wherein the storage electrode is simultaneously formed with the gate line.

18. The method according to claim 10, further comprising forming a terminal line at a boundary of the substrate, the terminal line being connected to the reflective plate.

* * * * *